(12) United States Patent
Tetaz et al.

(10) Patent No.: US 10,895,734 B2
(45) Date of Patent: Jan. 19, 2021

(54) KORSCH TELESCOPE

(71) Applicant: THALES, Courbevoie (FR)

(72) Inventors: Nicolas Tetaz, Cannes la Bocea (FR); François-Régis Gourillon, Cannes la Bocea (FR)

(73) Assignee: THALES, Courbevoie (FR)

( * ) Notice: Subject to any disclaimer, the term of this patent is extended or adjusted under 35 U.S.C. 154(b) by 192 days.

(21) Appl. No.: 16/164,600

(22) Filed: Oct. 18, 2018

(65) Prior Publication Data
US 2019/0121114 A1    Apr. 25, 2019

(30) Foreign Application Priority Data
Oct. 19, 2017   (FR) ...................................... 17 01087

(51) Int. Cl.
| | | |
|---|---|---|
| *G02B 23/02* | (2006.01) | |
| *G02B 23/16* | (2006.01) | |
| *G02B 23/06* | (2006.01) | |
| *G02B 7/183* | (2006.01) | |
| *G02B 17/06* | (2006.01) | |

(52) U.S. Cl.
CPC .............. *G02B 23/02* (2013.01); *G02B 7/183* (2013.01); *G02B 17/0631* (2013.01); *G02B 17/0636* (2013.01); *G02B 23/06* (2013.01); *G02B 23/16* (2013.01)

(58) Field of Classification Search
None
See application file for complete search history.

(56) References Cited

U.S. PATENT DOCUMENTS

| | | | | |
|---|---|---|---|---|
| 2,504,383 A | * | 4/1950 | Bouwers ................ | G02B 23/00 359/366 |
| 2,670,656 A | * | 3/1954 | Braymer ................ | G02B 23/00 359/723 |
| 3,443,853 A | | 5/1969 | Todd, Jr. | |
| 4,043,643 A | * | 8/1977 | Sigler ................ | G02B 17/0808 359/729 |

(Continued)

FOREIGN PATENT DOCUMENTS

FR          932 048 A         3/1948

OTHER PUBLICATIONS

Yang, et al., "Development of Cassegrain Type 0.9-m Collimator", SPIE Proceedings, vol. 5869, p. 586913, Aug. 18, 2005.

*Primary Examiner* — Derek S. Chapel
(74) *Attorney, Agent, or Firm* — BakerHostetler

(57) ABSTRACT

An anastigmat Korsch telescope with three aspherical mirrors includes a bearing structure having a first face to which the first mirror is attached, a hollow structure of a shape elongated in a direction substantially perpendicular to the plane of the central aperture, limited by walls attached to the inside of which are the second mirror in a portion of the hollow structure located in front of the first mirror, and at least one other mirror selected from the third mirror and the at least one deflecting mirror, the walls having at least one first aperture so as to allow a light beam to pass through coming from the object originating from the first mirror and heading toward the second mirror, the bearing structure further comprising means of attachment of the hollow structure to the bearing structure, at least one structure selected from the hollow structure and the bearing structure having a portion traversing the central aperture.

20 Claims, 18 Drawing Sheets

(56) References Cited

U.S. PATENT DOCUMENTS

| | | | |
|---|---|---|---|
| 4,413,177 A | | 11/1983 | Godwin, Jr. et al. |
| 5,138,484 A | * | 8/1992 | Schubert ............ G02B 17/0808 250/330 |
| 5,181,145 A | | 1/1993 | Eden |
| 6,118,579 A | * | 9/2000 | Endemann ........... G02B 17/061 359/364 |
| 2018/0164573 A1 | | 6/2018 | Tetaz |

* cited by examiner

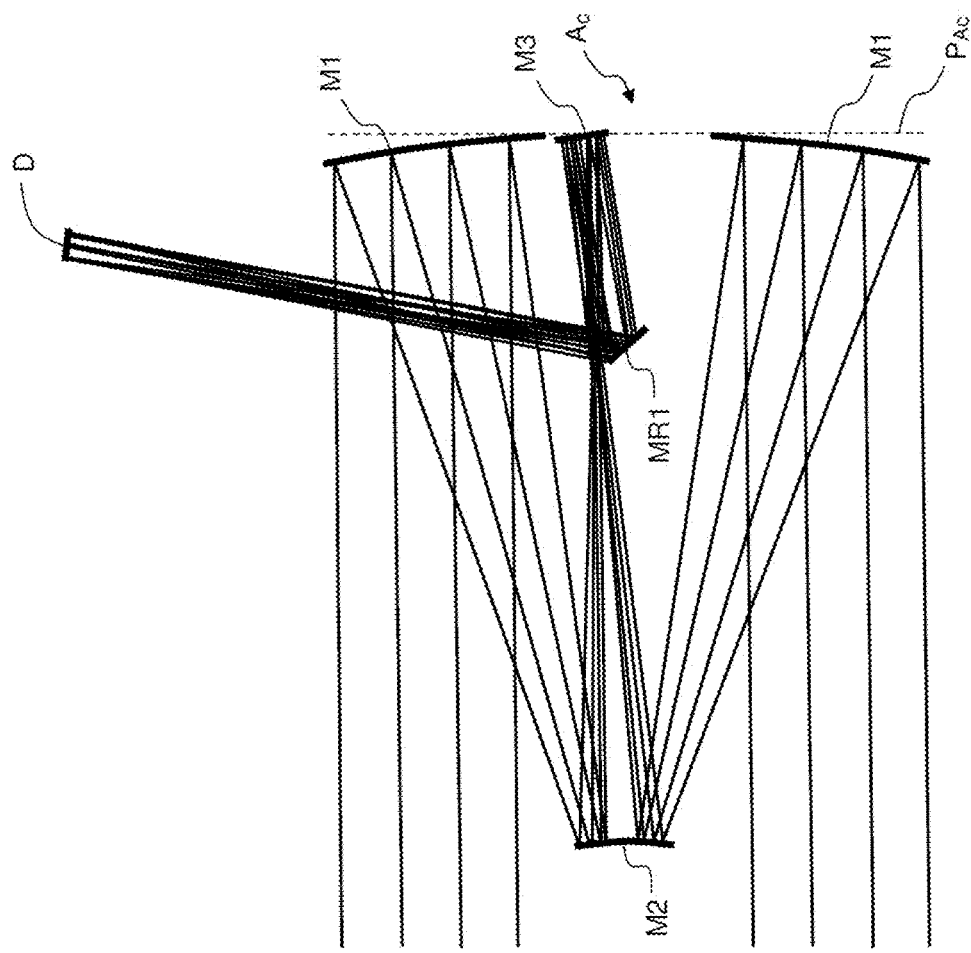

KORSCH TELESCOPE

CROSS-REFERENCE TO RELATED APPLICATIONS

This application claims priority to foreign French patent application No. FR 1701087, filed on Oct. 19, 2017, the disclosure of which is incorporated by reference in its entirety.

FIELD OF THE INVENTION

The field of the invention is that of telescopes, notably that of observation telescopes embedded in satellites. More specifically, the field of the invention relates to Korsch long-focus catoptric systems.

BACKGROUND

Historically, the first telescopes used were Ritchey-Chretien telescopes, comprising two concave $M1_{RC}$ and convex $M2_{RC}$ mirrors and a set of lenses L arranged in front of the focal plane $P_F$ comprising the detector D as illustrated in FIG. 1. The lenses are substantially of the size of the detector, which limits this to approximately 200-300 mm.

These telescopes are very compact but the use of lenses limits the achievable field, and a Ritchey-Chretien telescope generally has a linear field of less than 0.8°.

For 20 years the standard for long-focus space telescopes has been the "Korsch" telescope as illustrated in FIG. 2, which makes it possible to obtain a larger field than that of the Ritchey-Chretien.

The Korsch telescope, also known as a TMAL (abbreviation of "Three Mirror Anastigmat") is an anastigmat telescope with three aspherical mirrors (or of the Concave-Convex-Concave type) which comprises at least one first concave mirror M1, a second convex mirror M2 and a third concave mirror M3. The first, second and third mirrors M1, M2 and M3 are aspherical, of fixed shapes, each mirror being characterized by at least two parameters, a radius of curvature and a conic.

This optical system has an optical axis O well known to the person skilled in the art, defined by the radius passing through the center of the entrance pupil $P_E$ and perpendicular to this pupil.

The three mirrors M1, M2 and M3 are arranged so that the first mirror M1 and the second mirror M2 form an intermediate image $P_{FI}$ of an object at infinity, the image being located between M2 and M3, this third mirror forming a final image of this intermediate image in the focal plane of the telescope wherein a detector D is placed.

At least one deflecting mirror MR1 helps make the system more compact. This or these deflecting mirror(s) may be arranged between M2 and M3 and/or between M3 and the detector D (see farther on).

The various elements (mirrors M1, M2, and M3, deflecting mirror(s) and detector) of the telescope are arranged according to an order, positions and optical characteristics that define the optical combination of the telescope.

The front of M1 is defined as the area of space located on the side of M1 via which the light beam coming from the object arrives and incident on M1. The mirror M1 and the mirrors arranged in front of M1, i.e. typically M2 in FIG. 2, constitute the front cavity Cav, while the mirrors arranged at the rear of M1, typically M3, the deflecting mirror MR1 and the detector D in FIGS. 2, 3a to 3c constitute the rear cavity Carr.

By applying the Korsch equations well-known to the person skilled in the art, the respective positions and parameters of the three mirrors M1, M2 and M3 are easily calculated. The theoretical solution is of very good quality, which is what makes this type of telescope so useful. This type of telescope typically makes it possible to obtain fields of 2° or 3°.

Typically from a focal length and predetermined distances between M1 and M2 and between M2 and M3, the Korsch equations implemented by optical calculation software determine the distance between e.g. M3 and the focal plane $P_F$ and the radii of curvature and conics of the three mirrors M1, M2 and M3.

For correct operation of the telescope, it is necessary to align all of the optical components of the combination with great precision. The main function of the telescope's structure is to ensure a precise and stable positioning of the elements for capturing the signal of an observed scene. In the design of high resolution instruments, priority is given to the performance and compactness of the combination which leads to particular mechanical architectures, often difficult to design, manufacture, assemble then adjust.

In a conventional mechanicothermal telescope architecture with a Korsch optical combination, the structure is as follows:

the front cavity Cav supports the M2 by "spider-vanes"
an optical bench supports the M1
the rear cavity Carr supports the rest of the combination.

Such structuring of the telescope tends to increase the number of mechanical parts. Moreover, a particularly delicate adjustment is that of the positioning of M2 with respect to M1.

Indeed, the front cavity is often made using a lattice connected to the M2, which requires fine positioning with respect to the M1. The positioning of the M2 is often performed using a hexapod (device for adjusting the positioning of M2 according to the 6 degrees of freedom 3 rotations/3 translations) before bonding.

The optimum position of the M2 is adjusted on the ground using optomechanical means. Once this position has been reached, the M2 is rigidly attached to the front cavity by adhesive injection, which allows stress-free mounting of this mirror in the telescope.

This solution has several drawbacks:
high manufacturing costs, related to the materials used and the number of parts to be manufactured and the development of optomechanical ground adjustment means specific to each telescope,
difficult integration, since the M2 must be positioned stress-free on the spider vanes,
in addition, this positioning requires an adjustment of the M2 upstream of the telescope (behind the M2), thus blocking the luminous flux likely to disrupt the ground adjustment of this mirror.

Moreover, the optical bench supporting the M1 requires mechanicothermal performance difficult to achieve with current manufacturing means. Indeed, the manufacturing procedure of the optical bench (honeycombed) and the control means require very qualified staff specialized in this type of method.

For the rear cavity, the variability of the optical combinations provided makes it impossible to standardize the mechanicothermal design. This results in non-recurring costs, and skills that are not very transposable from one solution to another.

Finally, the whole integration of the telescope requires precise adjustment of the interfaces, with the use of special tools. This increases the number of mechanical parts, and items associated with the uncertainty of positioning.

Korsch telescope structures according to the prior art, due to the multiplicity of the elements and the need for very precise positioning of the various components with respect to each other, particularly that of M2 to M1, leads to particular, specific mechanical architectures, often difficult to design, manufacture, assemble then adjust.

It may be considered that the front cavity of a Korsch has a volume similar to that of a Ritchey-Chretien telescope, with an equivalent focal length. The increase in the field is therefore achieved at the cost of an increase in the overall dimensions of the instrument.

There are many reflection options, using multiple reflector mirrors, for reducing the dimensions of the rear cavity Carr, as illustrated in FIGS. 3a, 3b, and 3c. FIG. 3a illustrates an option with two deflecting mirrors and FIGS. 3b and 3c with three deflecting mirrors.

In order to further reduce the length of the telescope, there remains only the length of the front cavity Cav as a degree of freedom, i.e. to reduce the distance $d_{12}$ between M1 and M2. However, the reduction of $d_{12}$ in the optical combination of the telescope entails an increase in the displacement sensitivity of the M2 (due to the thermoelastic stresses): dividing the distance $d_{12}$ by two multiplies the sensitivity to movement of M2 by a factor of approximately 4. Moreover, a shorter distance $d_{12}$ makes the mirror M1 more open, i.e. having a smaller radius of curvature, which makes it more difficult to polish. This line of compacting therefore reaches a limit.

One aim of the present invention is to overcome the aforementioned drawbacks by providing an improved Korsch telescope having a simplified mechanicothermal architecture, making it possible to improve the mechanicothermal performance of the structure, ensuring modularity in the optical combination. The telescope according to the invention is more robust to the movement of the mirrors, and therefore easier to manufacture. Moreover, this new architecture is compatible with more compact optical combinations, without a rear cavity.

SUMMARY OF THE INVENTION

The object of the present invention is an anastigmat Korsch telescope with three aspherical mirrors comprising at least one first concave mirror having a central aperture, a second convex mirror arranged in front of the first mirror, a third concave mirror, at least one first deflecting mirror and a detector.

The mirrors are arranged so that the first mirror and the second mirror form an intermediate image of an object at infinity, the image being located between the second mirror and the third mirror, the third mirror forming a final image of this intermediate image in the focal plane of the telescope wherein the detector is placed.

The telescope further comprises:

a bearing structure having a first face to which the first mirror is attached, a hollow structure of a shape elongated in a direction substantially perpendicular to the plane of the central aperture, limited by walls, attached to the inside of which are the second mirror in a portion of the hollow structure located in front of the first mirror, and at least one other mirror selected from the third mirror and the at least one deflecting mirror.

The walls have at least one first aperture so as to allow a light beam to pass through coming from the object originating from the first mirror and heading toward the second mirror.

The bearing structure further comprises means of attaching the hollow structure to the bearing structure, and at least one structure selected from the hollow structure and the bearing structure has a portion traversing said central aperture.

Preferably the bearing structure has a hollow front portion traversing the central aperture and surrounding a portion of the hollow structure, the means of attachment being arranged at the level of said front portion of the bearing structure.

According to one embodiment the bearing structure is in one piece.

Preferably the telescope according to the invention further comprises a rear frame, and the bearing structure is attached to said rear frame.

Preferably the walls of the hollow structure comprise at least one second aperture so as to allow a light beam to pass through coming from a mirror attached to the inside of the hollow structure and heading toward the next mirror of the optical combination arranged outside the hollow structure.

According to one embodiment the means of attachment consist of adhesive injected via injection holes made in the front portion of the bearing structure.

According to one embodiment, the elongated hollow structure also traverses the central aperture, thus having one portion located at the rear of the first mirror.

According to one embodiment the telescope further comprises a support structure attached to the portion of the hollow structure located at the rear of the first mirror, and to which are attached one or more elements of the telescope where applicable.

According to a variant the at least one other mirror attached to the inside of the hollow structure is the first deflecting mirror, arranged in the portion of the hollow structure at the rear of the first mirror.

According to another variant the at least one other mirror attached to the inside of the hollow structure is the third mirror.

According to an embodiment of this other variant the third mirror is substantially arranged in the plane of the central aperture of the first mirror.

A first distance is defined as the distance between the first and the second mirror and a second distance as the distance between the second mirror and the third mirror. Preferably the second distance is between 90% and 150% of the first distance.

According to one embodiment the first deflecting mirror is also attached to the inside of the hollow structure in the portion of the hollow structure located in front of the first mirror.

According to a third variant the at least one other mirror attached to the inside of the hollow structure is the first deflecting mirror and wherein the third mirror is substantially arranged in the plane of the central aperture of the first mirror and is attached to the bearing structure. According to a sub-variant the bearing structure has a rear hollow portion to the outside of which the detector is attached.

Preferably a deflecting mirror is substantially arranged in an exit pupil of the telescope.

According to one embodiment this deflecting mirror is active.

According to another embodiment a deflecting mirror is substantially arranged in an exit pupil of the telescope, is aspherical and adapted to a first focal length of the telescope, and is retractable so as to be replaced by at least one other deflecting mirror adapted respectively to another focal length, different from the first focal length.

According to another aspect the invention relates to a method of manufacturing an anastigmat Korsch telescope with three aspherical mirrors comprising at least one first concave mirror having a central aperture, a second convex mirror, a third concave mirror, at least one first deflecting mirror and a detector, the mirrors being arranged so that the first mirror and the second mirror form an intermediate image of an object at infinity, the image being located between the second mirror and the third mirror, the third mirror forming a final image of this intermediate image in the focal plane of the telescope wherein the detector is placed.

The method comprises the steps of:

providing a bearing structure having a first face to which the first mirror is attached and having a hollow front portion traversing the central aperture of the first mirror, providing a hollow structure of elongated shape and limited by walls, attached to the inside of which are the second mirror and at least one other mirror selected from the third mirror and the at least one deflecting mirror, said walls of the hollow structure having at least one first aperture, inserting the hollow structure into the front hollow portion of the bearing structure, positioning said hollow structure with respect to the bearing structure in a direction substantially perpendicular to the plane of the central aperture with a position adjustment device, so that the second mirror is positioned in front of the first mirror at a determined position with respect to the first mirror, the first aperture being configured so as to allow a light beam to pass through coming from the object, originating from the first mirror and heading toward the second mirror, attaching the hollow structure to the bearing structure by means of attachment implemented from the front portion of the bearing structure, withdrawing the position adjustment device.

According to one embodiment, the positioning step consists in sliding then temporarily attaching to the inside of the hollow structure an intermediary tool connected to an adjustment device outside the structure allowing an adjustment with 6 degrees of freedom, then adjusting said position.

According to one embodiment the attachment step consists in injecting an adhesive via injection holes arranged in the front portion of the bearing structure.

BRIEF DESCRIPTION OF THE DRAWINGS

Other features, aims and advantages of the present invention will appear on reading the following detailed description referring to the appended drawings, given by way of non-restrictive examples, and wherein:

FIG. 3a illustrates an option with 2 deflecting mirrors.

FIG. 3b illustrates an option with 3 deflecting mirrors.

FIG. 3c illustrates another option with 3 deflecting mirrors.

FIGS. 9a-9c illustrate various optical configurations with the third mirror M3 arranged in the plane of the aperture Ac.

FIGS. 9a and 9b illustrate configurations with a single deflecting mirror MR1 and FIG. 9c illustrates a configuration with two deflecting mirrors MR1 and MR2.

DETAILED DESCRIPTION

Figure 1:
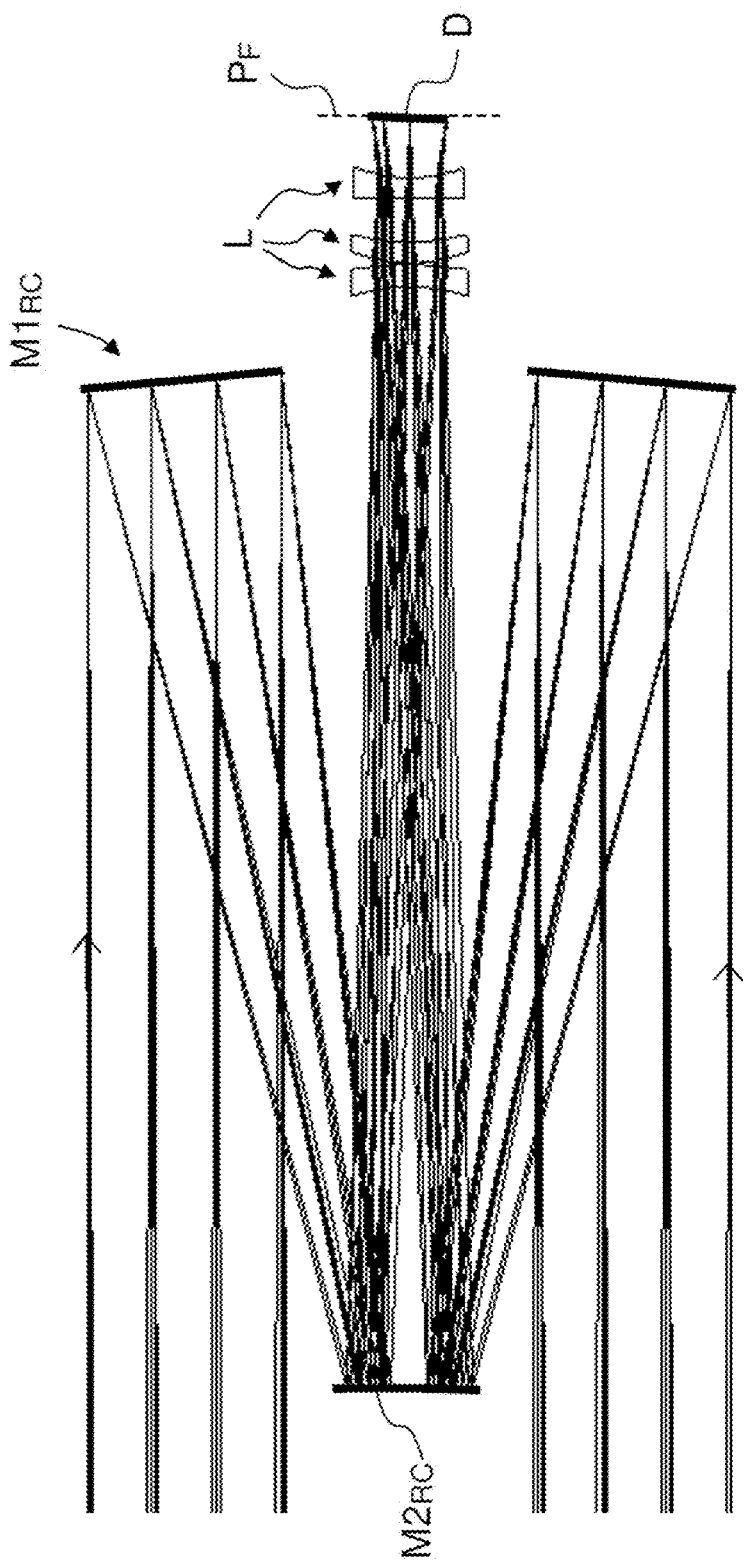
FIG. 1 already mentioned describes a Ritchey-Chretien telescope.
Figure 2:
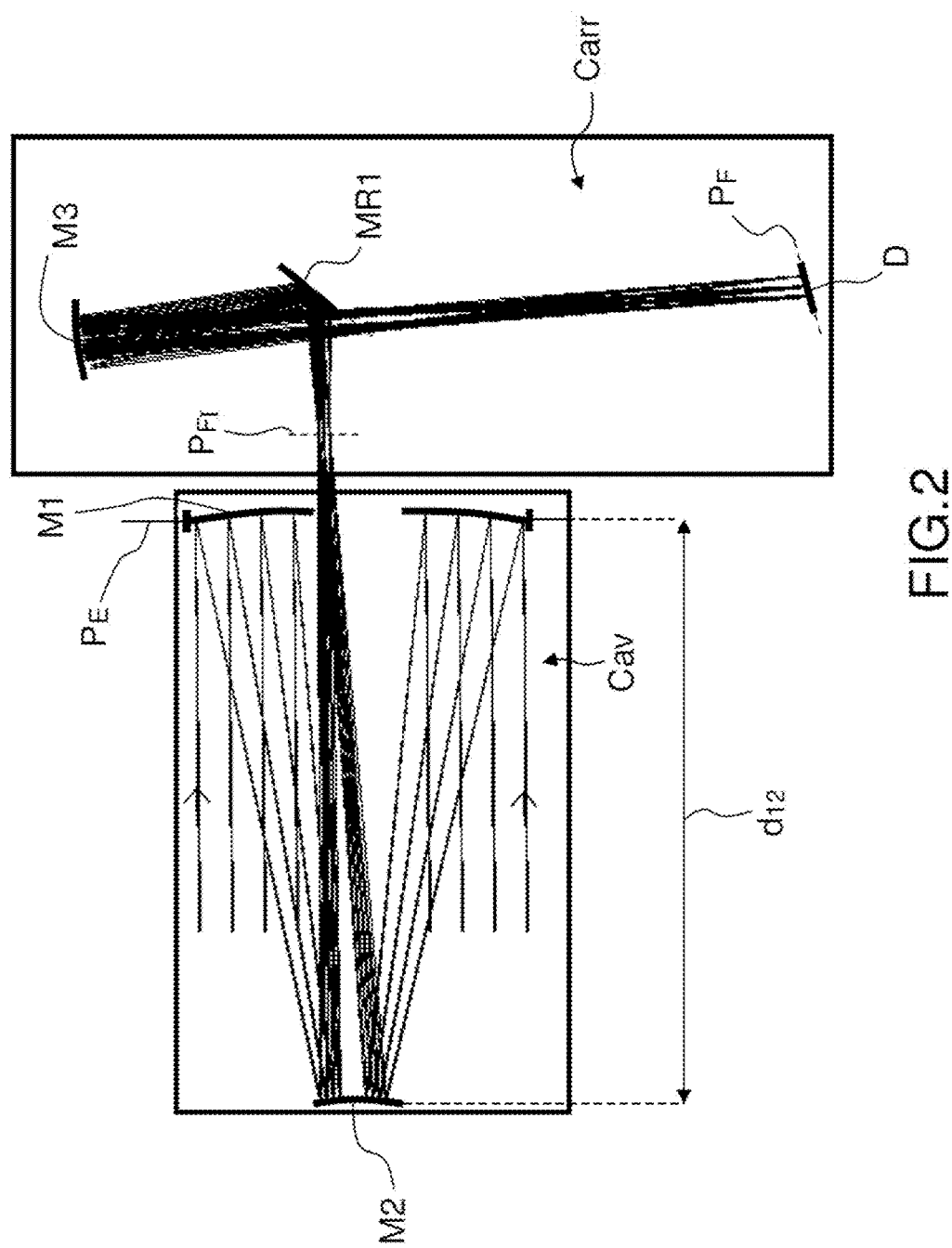
FIG. 2 already mentioned describes the optical combination of a "Korsch" long-focus space telescope known to the prior art.

The telescope according to the present invention is an anastigmat Korsch telescope 10 with three aspherical mirrors comprising at least one first concave mirror M1 having a central aperture Ac, a second convex mirror M2 arranged in front of the first mirror, a third concave mirror M3, at least one first deflecting mirror MR1 and a detector D. The number and the position of the deflecting mirrors is determined by the optical combination of the telescope. The mirrors M1, M2 and M3 are arranged so that M1 and the M2 form an intermediate image of an object at infinity, the image being located between M2 and M3, the latter forming a final image of this intermediate image in the focal plane of the telescope wherein the detector D is placed.

Various variants and embodiments of the telescope according to the invention are illustrated in FIGS. 4, 6, 8, 10, 11, 12 and 12a.

The telescope 10 according to the invention further comprises a bearing structure 50 having a first face to which the first mirror M1 is attached. The bearing structure 50 is therefore arranged at the rear of the M1.

The telescope according to the invention also comprises a hollow structure 40 of a shape elongated in a direction substantially perpendicular to the plane of the central aperture limited by walls. The second mirror M2 is attached to the inside of the hollow structure 40 in a portion of the hollow structure located in front of M1. At least one other mirror, selected from the third mirror M3 and the at least one deflecting mirror MR1, is also attached to the inside of the elongated hollow structure 40.

The hollow structure 40 preferably has a symmetry of revolution, and an overall tubular shape, but having different portions of different diameters. It may also be made up of multiple modular portions.

The walls have at least one first aperture Ap1 so as to allow a light beam to pass through coming from the object originating from M1 and heading toward M2.

Moreover, the bearing structure 50 further comprises the means of attachment of the hollow structure 40 to this bearing structure 50. One advantage of attaching the hollow structure 40 to the bearing structure, rather than directly to the M1, is that the hollow structure that supports the M2 and the mirror M1 is kinematically dissociated (no mechanical connection between the two mirrors before bonding), which allows the adjustment of M2 with respect to M1.

The bearing structure is an intermediate part between the hollow structure and the primary mirror which helps limit the transmitted forces. In an embedded application on a satellite, for example, this configuration offers several advantages:

on the ground, the bearing structure allows a preferential force path of the hollow structure toward the frame. The deformation transmitted to the primary mirror is therefore greatly reduced, and does not require gravity compensation means.

on launching, the bearing structure helps filter the vibrations of the hollow structure, supporting the secondary mirror in cantilevered fashion. Indeed, the architecture makes it possible to decorrelate the modes of the structure and the mirrors, which limits the forces transmitted to the primary mirror M1 as well as the risk of rupture.

in flight, the bearing structure helps limit the transmission of deformations linked to loading in flight, by the integration of mirror attachment devices, notably for the primary mirror.

Finally, at least one structure selected from the hollow structure 40 and the bearing structure 50 has a portion traversing the central aperture Ac.

Figure 4:
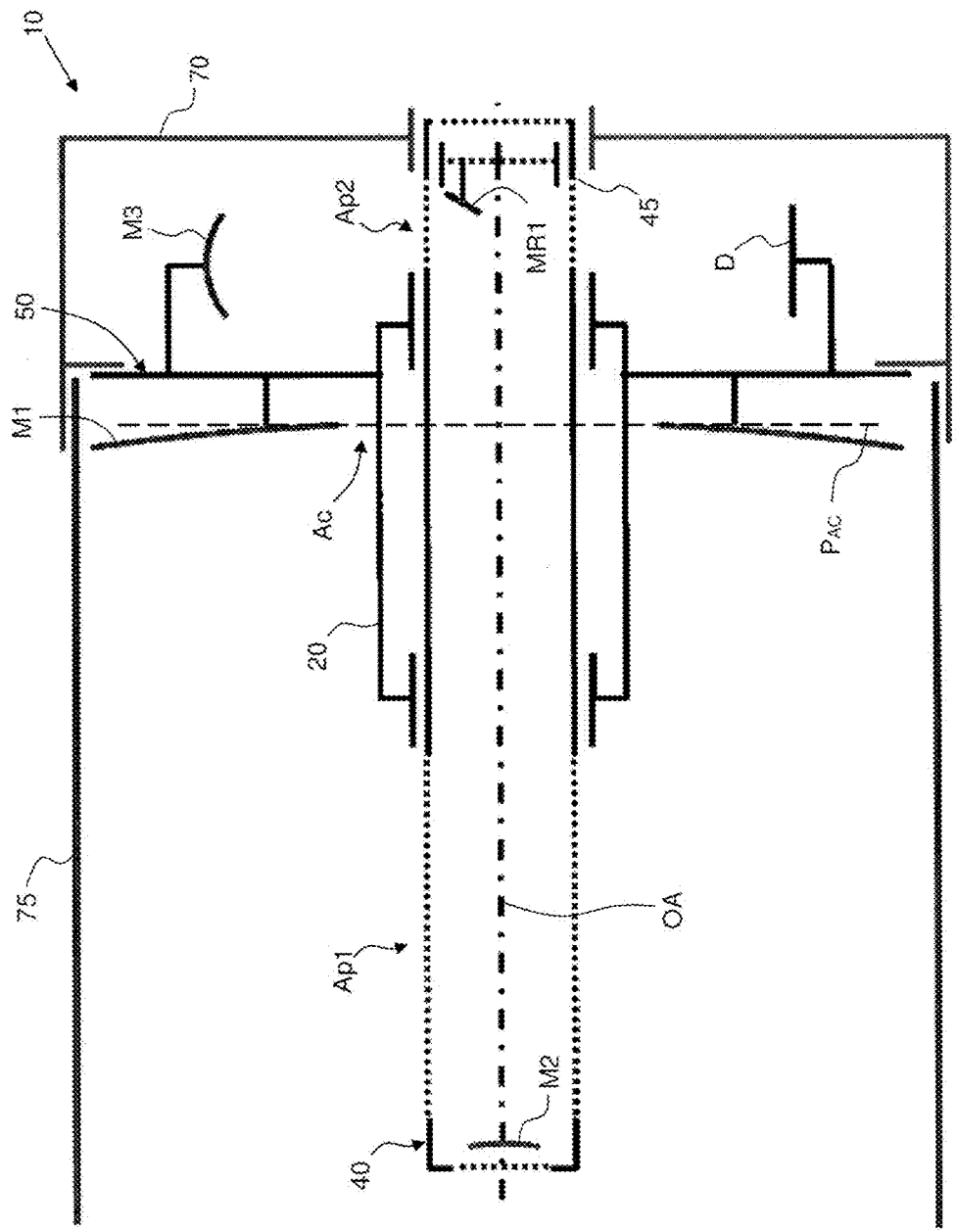
FIG. 4 illustrates one embodiment of the telescope according to the invention corresponding to the optical configuration of FIG. 1.

The optical axis OA of the telescope is defined as the straight line that connects the centers of curvature of all the mirrors. This axis coincides with the axis which passes through the center of the entrance pupil and is perpendicular to the plane of this pupil. The optical axis between M1 and M2 also passes through the center of symmetry (vertex) of the mirror M1 and is illustrated in FIG. 4. The plane of the central aperture $P_{AC}$ is perpendicular to the optical axis.

The longitudinal axis of the bearing structure 50 is substantially parallel to the optical axis between M1 and M2 to within a few degrees.

As described further on there are various variants of the telescope according to whether only one, only the other or both structures (bearing 50 and elongated hollow 40) have a portion traversing the central aperture Ac.

The structure of the telescope 10 according to the invention is modular and has a simplified mechanicothermal architecture, based on two main parts, the elongated structure 40 and the bearing structure 50.

The adjustment and integration logic is simplified since, once the elongated structure 40 is correctly positioned by a method described further on, it is sufficient to attach it to the bearing structure 50 by means of attachment.

The structure 40 ensures precise positioning of the mirror M2 (and of MR1 or M3) with respect to M1.

The other elements are then positioned more easily on this assembly, via the mirror attachment devices (DFM). Greater precision in the positioning of the optics is obtained, the dimension chain between the optics is reduced, which helps limit the cost of manufacturing parts and the uncertainties in positioning. Integration and testing are also simplified.

As described later, in several variants several mirrors and the detector D may be spaced out radially from the structure, which makes the architecture compatible with several Korsch optical combinations.

The first aperture Ap1 ensures the passage of rays originating from M1. The loss of potential flux may be offset by an enlargement of the diameter of M1, which is more limited in size by the front lattice.

Another advantage is that the bearing structure 50 creates a thermal insulation between front cavity and rear cavity.

Preferably the bearing structure 50 is in one piece, i.e. made at one time from a single material, which makes its manufacture compatible with additive synthesis and improves its thermoelastic behavior. The material is, for example, INVAR or $Si_3N_4$. Preferably the telescope according to the invention further comprises a rear frame 70, also referred to as a housing forming a fixed reference, to which the bearing structure 50 is attached.

Optionally the telescope 10 has a baffle 75 which protects the cavity from parasitic rays.

According to a preferred variant the bearing structure 50 has a hollow front portion 20 traversing the central aperture Ac and surrounding a portion of the hollow structure 40, the means of attachment being arranged at the level of said front portion 20 of the bearing structure 50.

This has the advantage of making the means of attachment accessible from the front of the M1. In addition, a bearing structure traversing the central aperture ensures a better rigidity for the hollow structure, thus ensuring the strength and stability of the parts at the launching of the satellite carrying the telescope. In ground adjustment, the bearing structure also helps limit the travel of the hollow structure in adjusting the position of the M2.

FIG. 4 illustrates one embodiment of the telescope according to the invention corresponding to the optical configuration of FIG. 1. The third mirror M3 and the detector D are attached to a second face of the bearing structure 50, on each side of the hollow structure respectively.

According to one embodiment, illustrated in FIGS. 4 to 8, the elongated hollow structure 40 also traverses the central aperture thus having one portion 45 located at the rear of the first mirror M1 and of the bearing structure 50. It is preferably in this rear portion that the other mirror, MR1 or M3, is attached.

Figure 5:
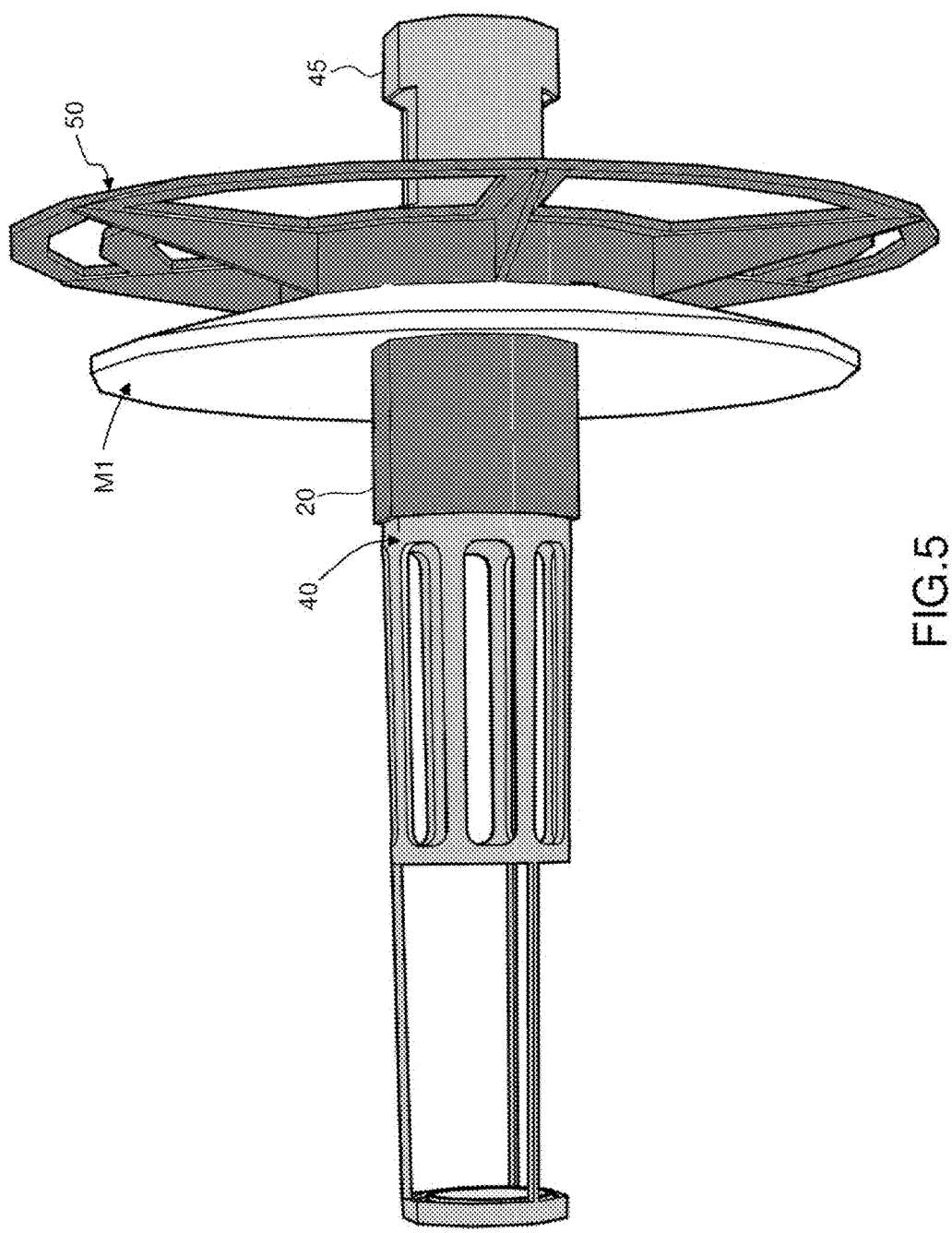
FIG. 5 is an example of a perspective view of the two main elements, the bearing structure 50 and the hollow structure, and of the first mirror M1 attached to the bearing structure 50.

FIG. 5 is an example of a perspective view of the two main elements 40 and 50 and of the first mirror M1.

Figure 3A:
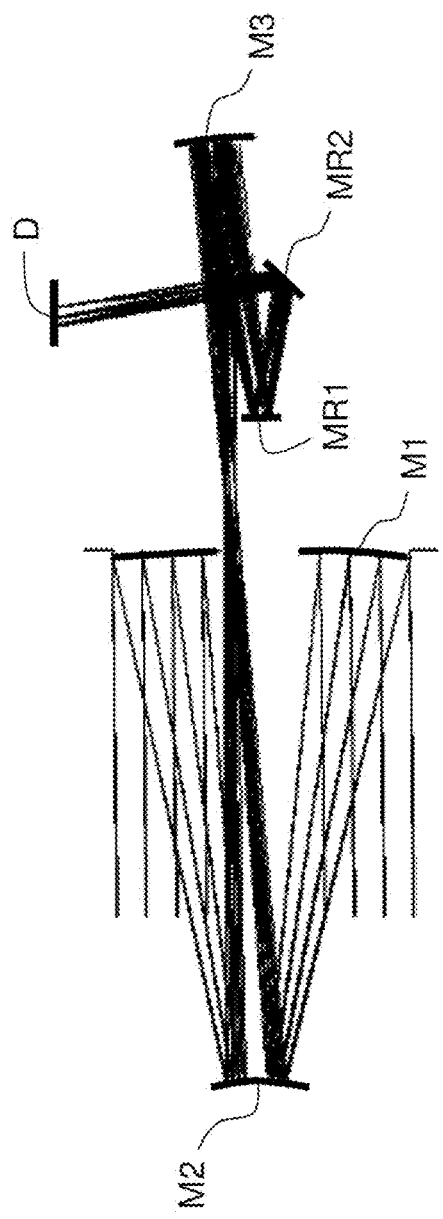
FIGS. 3a-3c illustrate various options for reducing the dimensions of the rear cavity Carr.
Figure 3B:
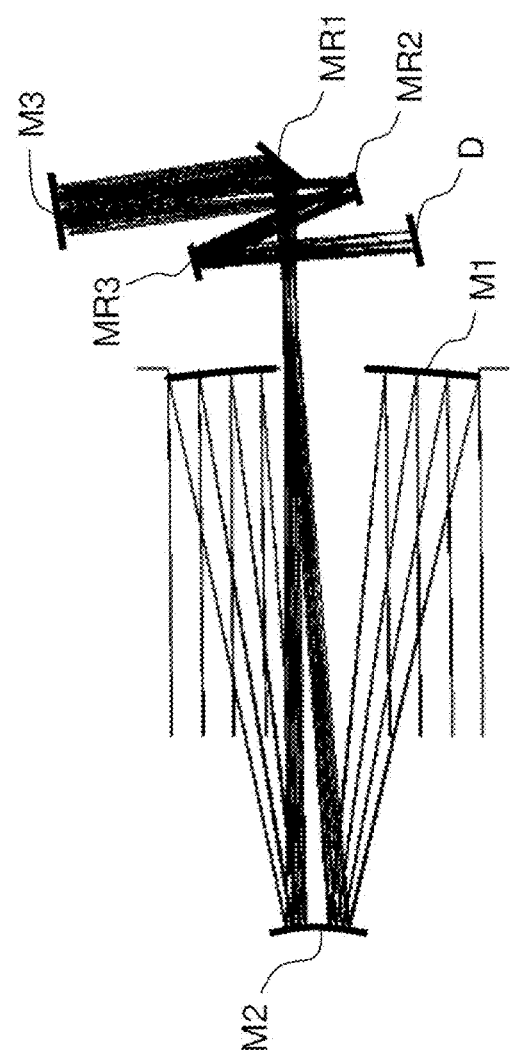
Figure 3C:
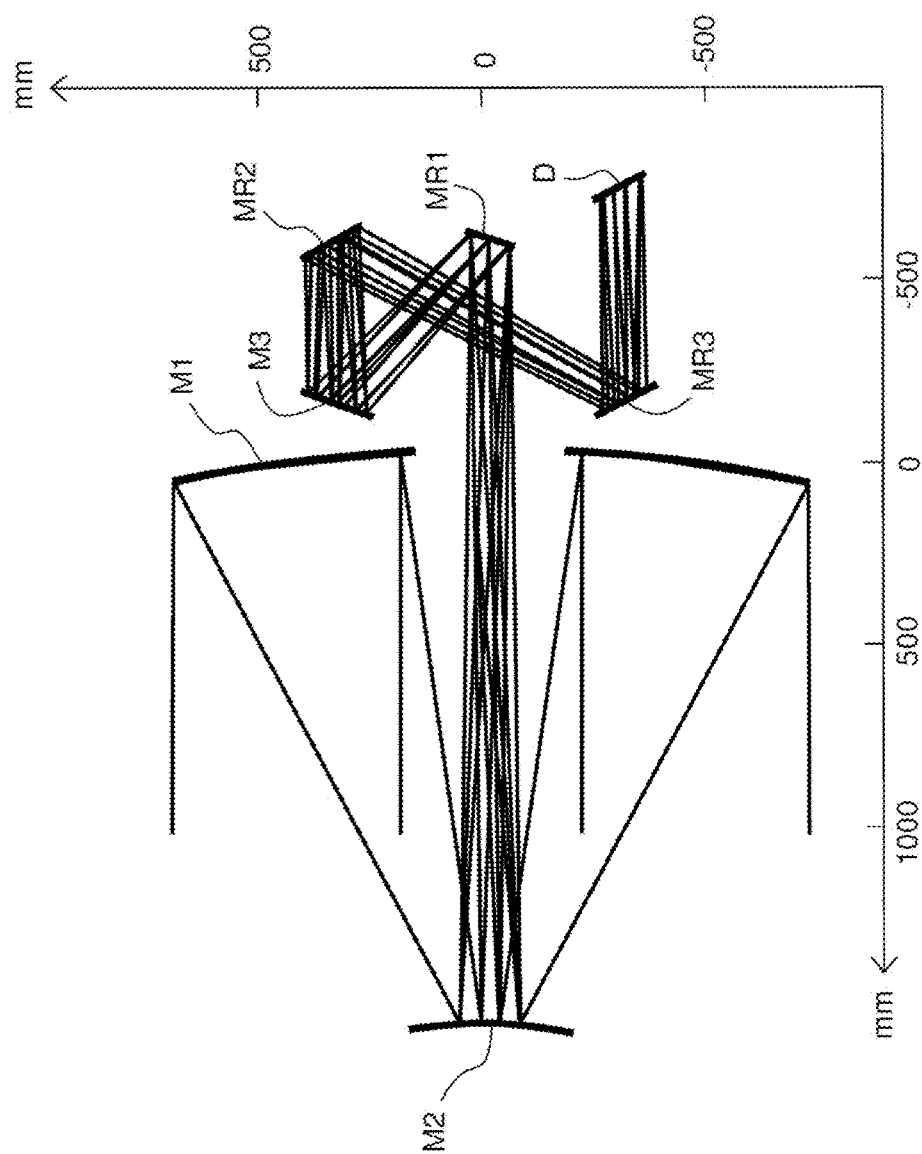
Figure 6:
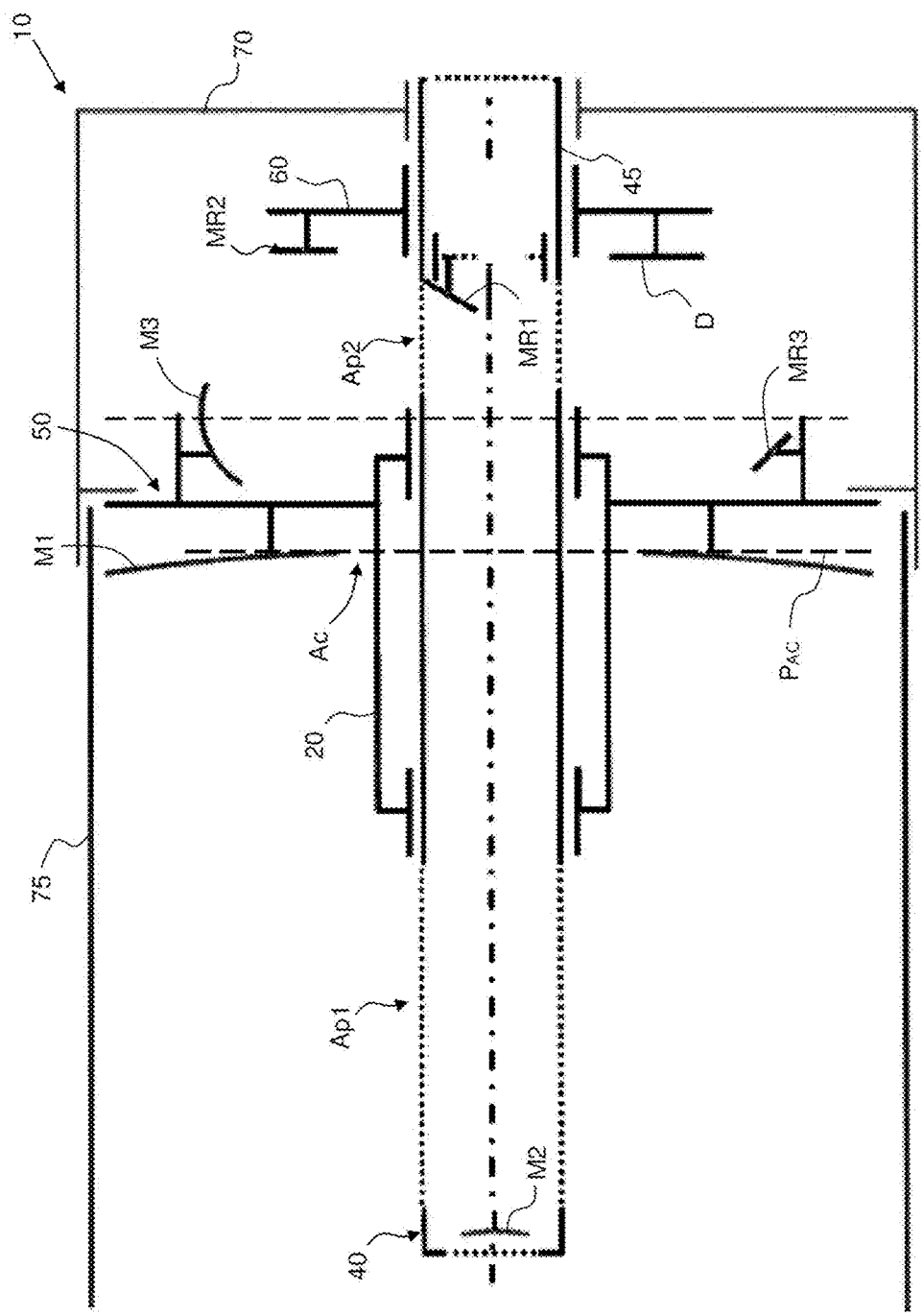
FIG. 6 illustrates an embodiment of the telescope according to the invention corresponding to the optical configuration of FIG. 3c with 3 deflecting mirrors MR1, MR2 and MR3.
Figure 7:
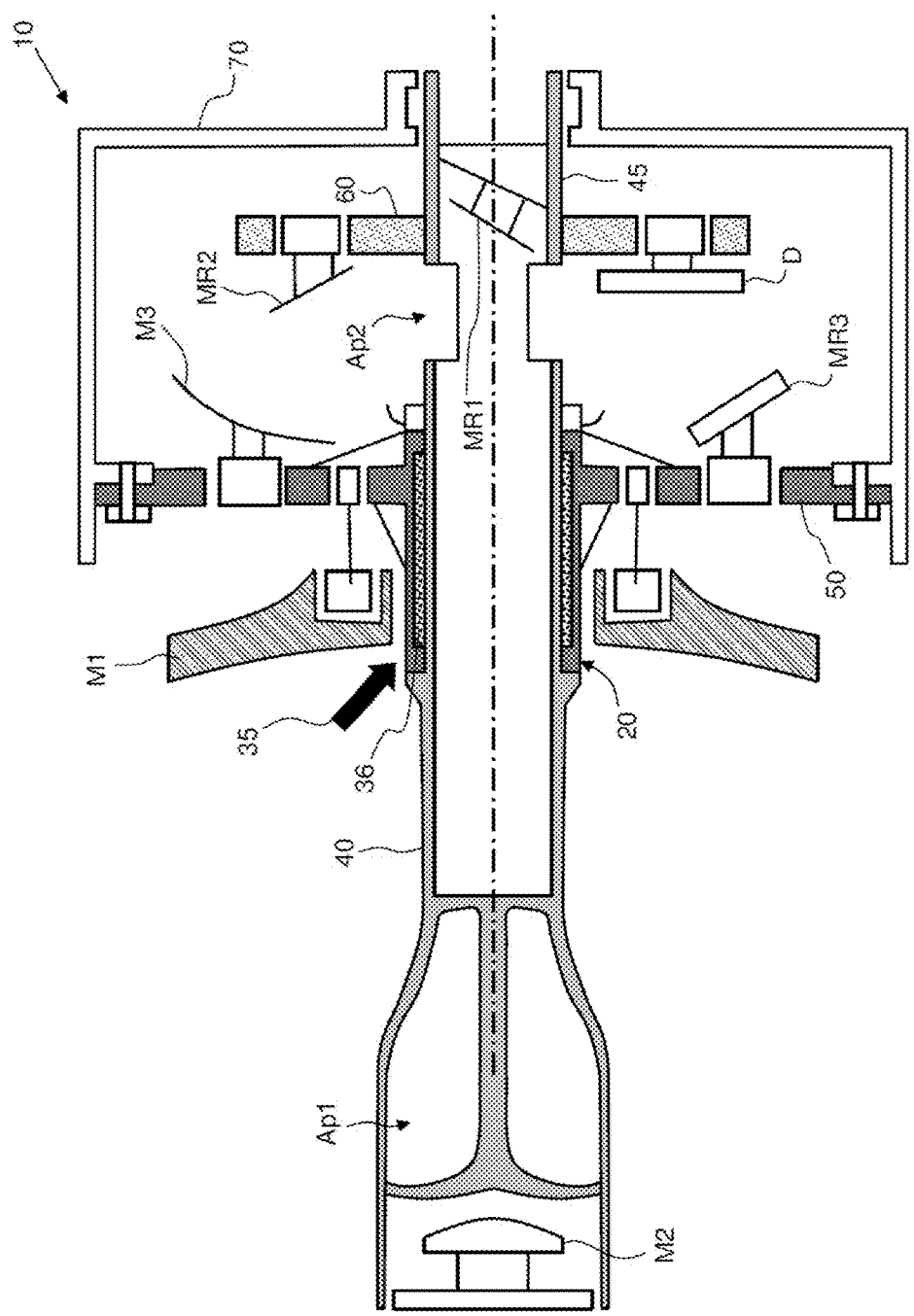
FIG. 7 illustrates an embodiment of the telescope according to the invention adopting the configuration of FIG. 6 wherein the means of attachment consist of adhesive.

FIG. 6 illustrates an embodiment of the telescope 10 according to the invention corresponding to the optical configuration of FIG. 3c with 3 deflecting mirrors MR1, MR2 and MR3. The third mirror M3 and the third deflecting mirror MR3 are attached to a second face of the bearing structure 50, on each side of the rear portion 45 of the hollow structure.

It is possible to have all the elements, including the detector D, inside the hollow structure 40. However, preferably a portion of the elements are arranged outside the structure 40. In this case the walls of the hollow structure comprise at least one second aperture Ap2 so as to allow a light beam to pass through coming from a mirror attached to the inside of the hollow structure 40 and heading toward the next mirror of the optical combination arranged outside the hollow structure 40.

For example, in FIG. 4 Ap2 is configured to allow the beam to pass through going from MR1 to M3 and the light beam going from M3 to D, in FIG. 6 Ap2 is configured to allow a light beam to pass through coming from MR1 and heading toward M3 and a light beam coming from the second deflecting mirror MR2 and heading toward the third deflecting mirror MR3 arranged on the opposite side of the rear portion 45 of the hollow structure.

The means of attachment may take the form of adhesive, rivets, screws or welding. According to a preferred embodiment illustrated in FIG. 7, adopting the configuration in FIG. 6, the means of attachment consist of adhesive 36 injected from the front of the M1 (see arrow 35) via injection holes made in the front portion 20 of the bearing structure. The structure 40 may thus be attached to the bearing structure 50 from the front of the M1. In comparison with a conventional front cavity architecture, the structure provided reduces the number of parts between the optics. An architecture is then obtained with simple assembly and adjustment of the optics, limited manufacturing costs and a reduction in the mass of the structure.

When the hollow structure 40 has a rear portion 45, according to one embodiment the telescope 10 further comprises a support structure 60 attached to the portion 45 to which one or more elements of the telescope are attached where applicable. For example, in FIGS. 6 and 7, MR2 and D are attached to the support 60. Thus the accessible optical combinations are multiplied.

According to one variant the at least one other mirror also attached to 40 is the first deflecting mirror MR1, as illustrated in FIGS. 4 and 6.

Figure 8:
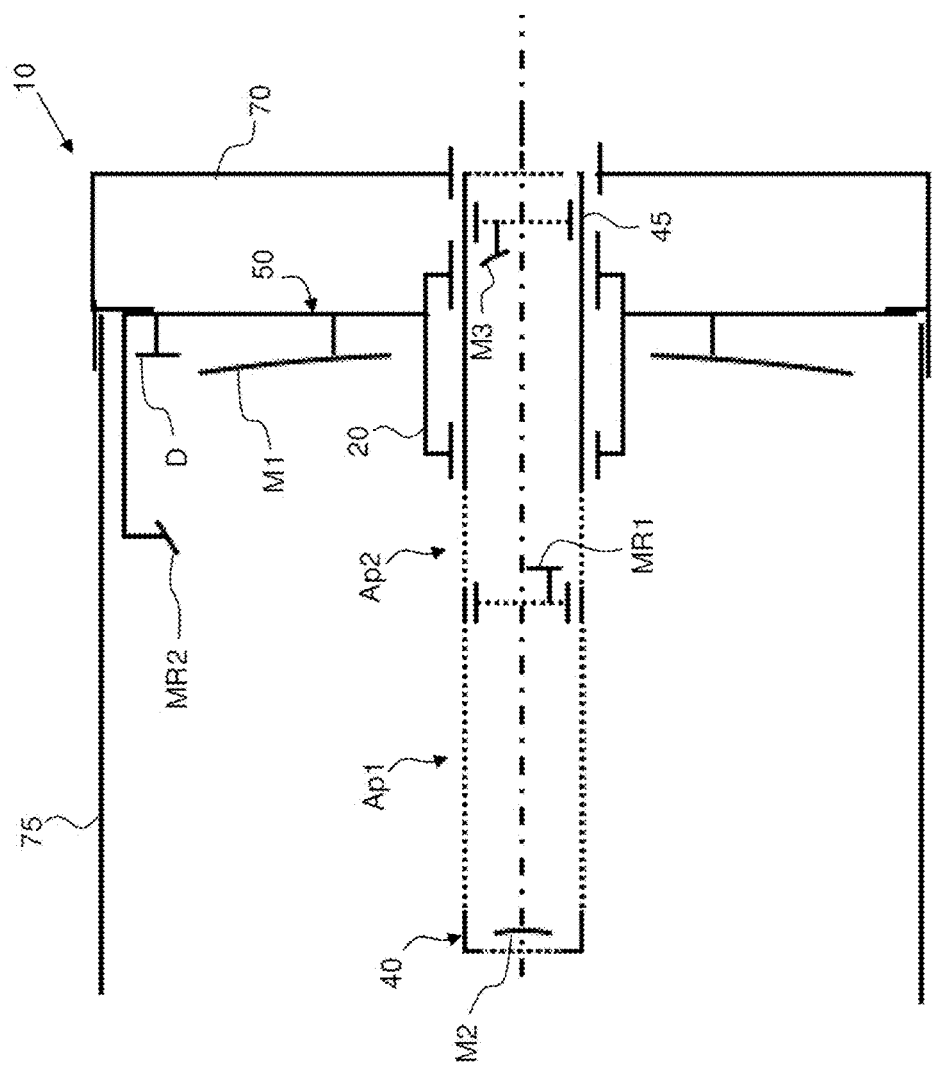
FIG. 8 illustrates a variant of the telescope according to the invention wherein the at least one mirror also attached to the hollow structure is the third mirror M3.

According to another variant the at least one mirror also attached to 40 is the third mirror M3, as illustrated in FIG. 8. The second deflecting mirror MR2 and the detector D are attached here to the bearing structure on the same face as that which supports M1.

According to a preferred embodiment of this variant the third mirror M3 is substantially arranged in the plane $P_{Ac}$ of the central aperture Ac of the first mirror M1. This plane Ac corresponds to the position of the mirror M1 in the optical combination. The mirror M3 is therefore located in the aperture Ac.

Preferably the first deflecting mirror MR1 which retrieves the light beam coming from the M3 is also attached in the hollow structure 40, which clearly improves the stability of the telescope. MR1 is preferably placed in the exit pupil of the telescope, which allows the use of this deflecting mirror either as a corrector of defects in the M1, or for adding a bifocal function.

Figure 9B:
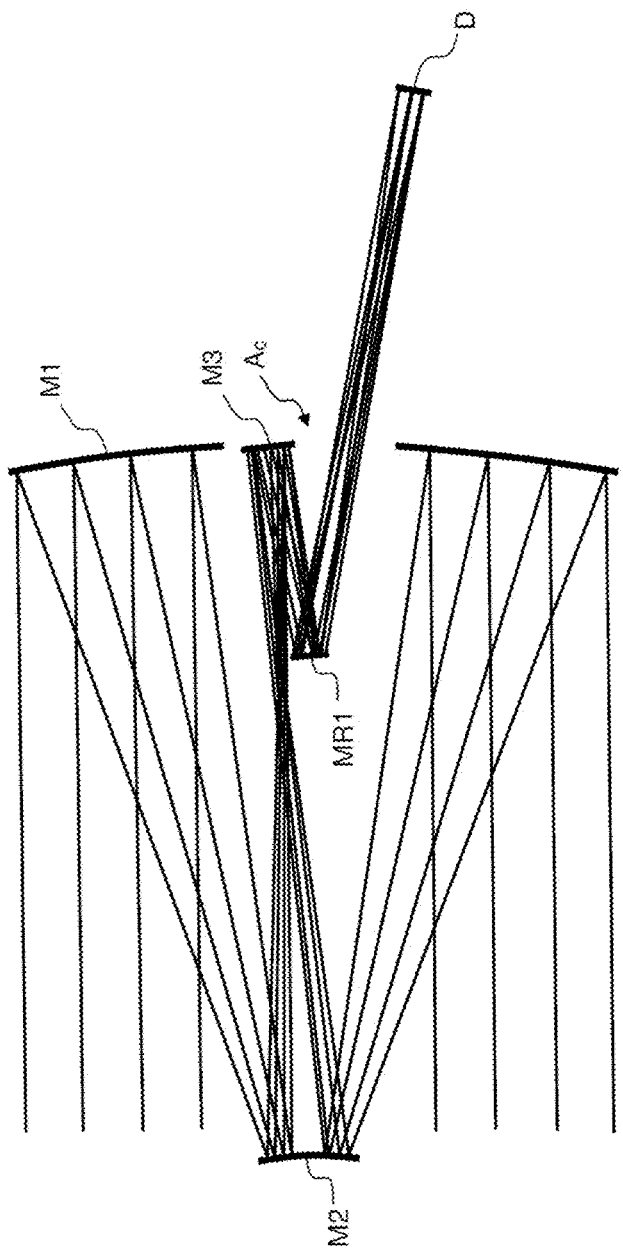
Figure 9C:
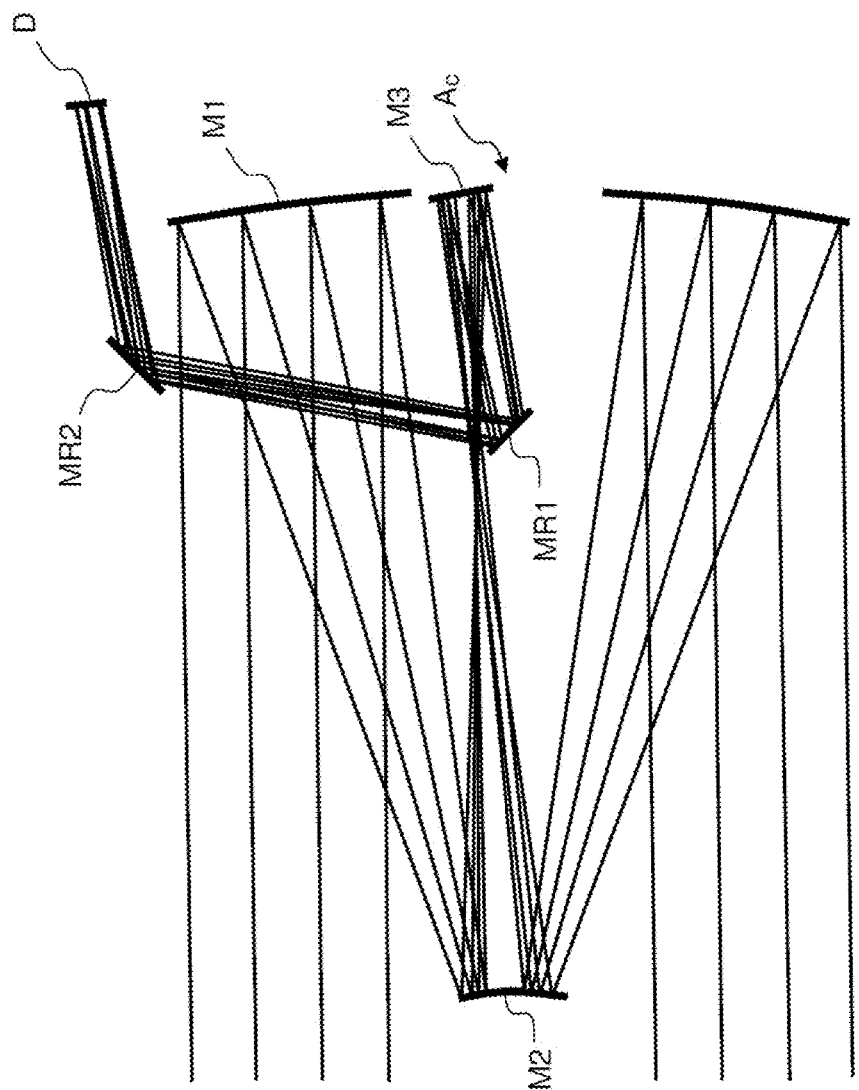

Various optical configurations are possible, 3 examples of which are illustrated in FIGS. 9a, 9b and 9c. In FIGS. 9a and 9b, there is a single deflecting mirror MR1 and in FIG. 9c there are two deflecting mirrors MR1 and MR2.

This embodiment has the advantage of eliminating the rear cavity, which leads to a significant gain in volume, due to reducing the length of the instrument by between ¼ and ⅓ and a significant gain in mass, of between ¼ and ⅓ of the weight of the instrument.

The telescope thus defined retains the advantages of a Korsch: compactness, attainable field of view >1°, intermediate focal plane and accessible exit pupil.

Sensitivity in positioning the M3 remains low, and sensitivity in positioning the M2 is improved if a portion of the gain in length obtained by eliminating the rear cavity is allocated to increasing the distance $d_{12}$ between M1 and M2.

The shadow of the second mirror M2 is defined as the area of space located between M1 and M2 not comprising light rays coming from the object, due to their masking by M2. M3 is preferably located in the shadow of the M2. The first deflecting mirror MR1 is also preferably arranged in the shadow of the M2.

$d_{12}$ is defined as the distance between M1 and M2 and $d_{23}$ as the distance between M2 and M3. The distance $d_{23}$ is therefore substantially equal to $d_{12}$ since M3 is substantially positioned in the plane of the central aperture. Preferably:

$$d_{23} > 0.9 \times d_{12}$$

The optical combinations with $d_{23}$ being lower are unbalanced and of poor quality.

In order to keep the advantage of eliminating the rear cavity, preferably:

$$d_{23} < d_{12} \times 1.5$$

According to a variant the mirror M3 may be polished directly on the M1.

According to a preferred embodiment the first deflecting mirror MR1 is also attached in the bearing structure 50 in a portion located in front of the M1.

Figure 10:
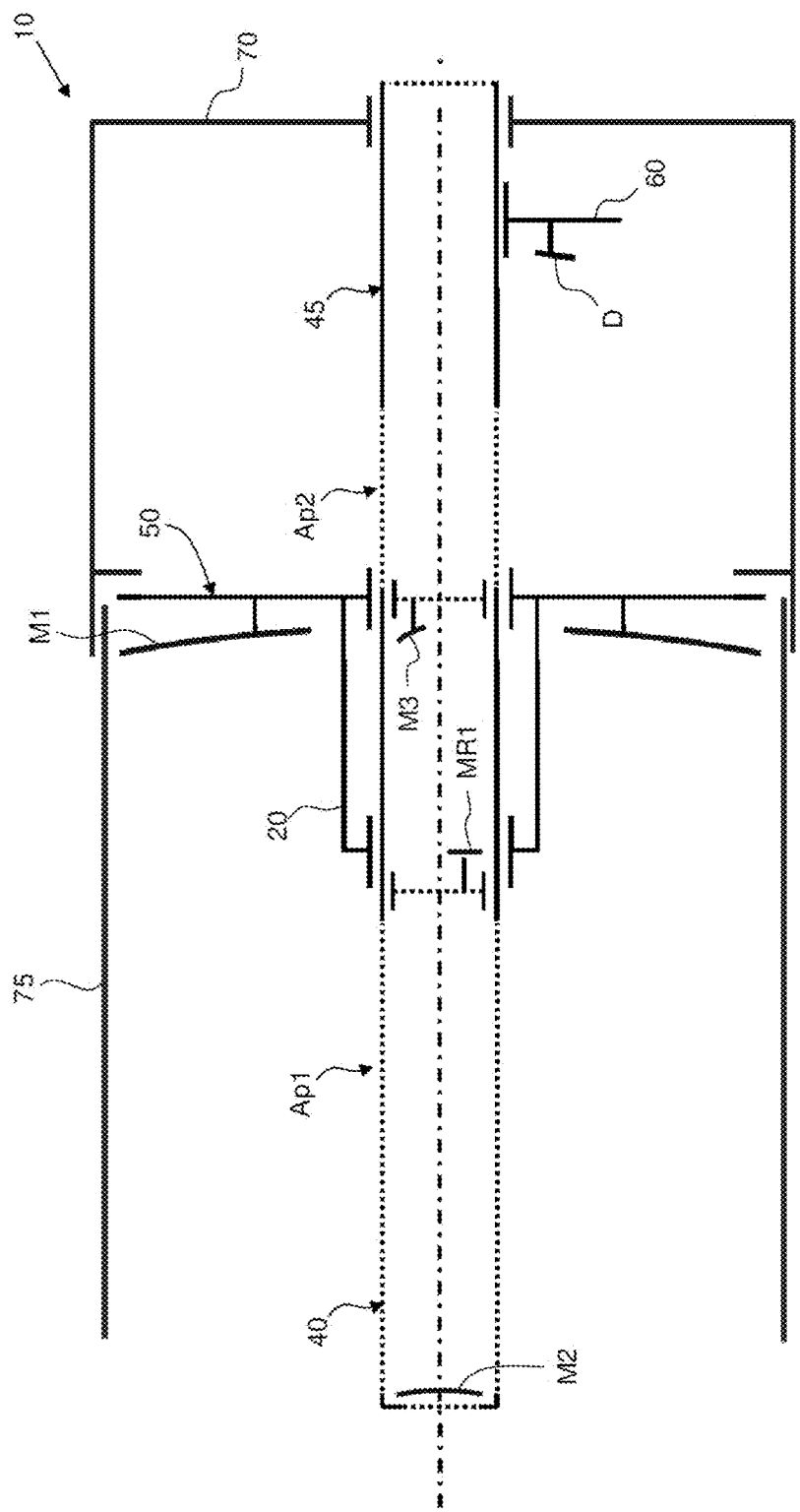
FIG. 10 illustrates the telescope 10 according to the invention corresponding to the optical configuration of FIG. 9b.

FIG. 10 illustrates the telescope 10 according to the invention corresponding to the optical configuration of FIG. 9b. The detector D is attached to the support structure 60, the second aperture Ap2 is configured to allow a light beam to pass through coming from the first deflecting mirror MR1 and heading toward the detector D.

Figure 11:
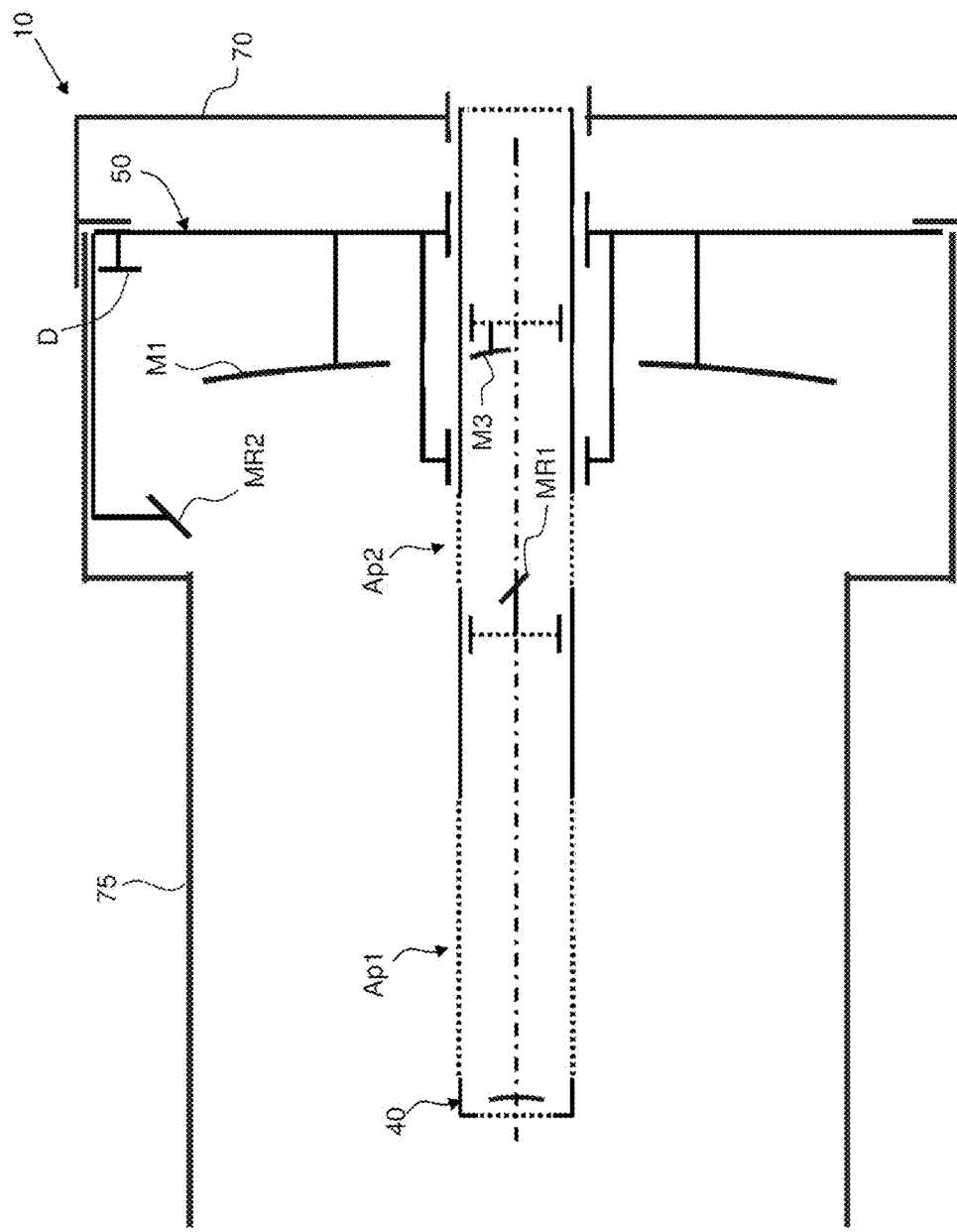
FIG. 11 illustrates the telescope 10 according to the invention corresponding to the optical configuration of FIG. 9c comprising a second deflecting mirror MR2.

FIG. 11 illustrates the telescope 10 according to the invention corresponding to the optical configuration of FIG. 9c comprising a second deflecting mirror MR2. The second deflecting mirror MR2 and the detector D are attached to the bearing structure 50 on the same face as that which supports the M1. The second aperture Ap2 is configured to allow a light beam to pass through coming from the first deflecting mirror MR1 and heading toward the second deflecting mirror MR2. The telescope here is ultra-compact, without a rear cavity.

Figure 12:
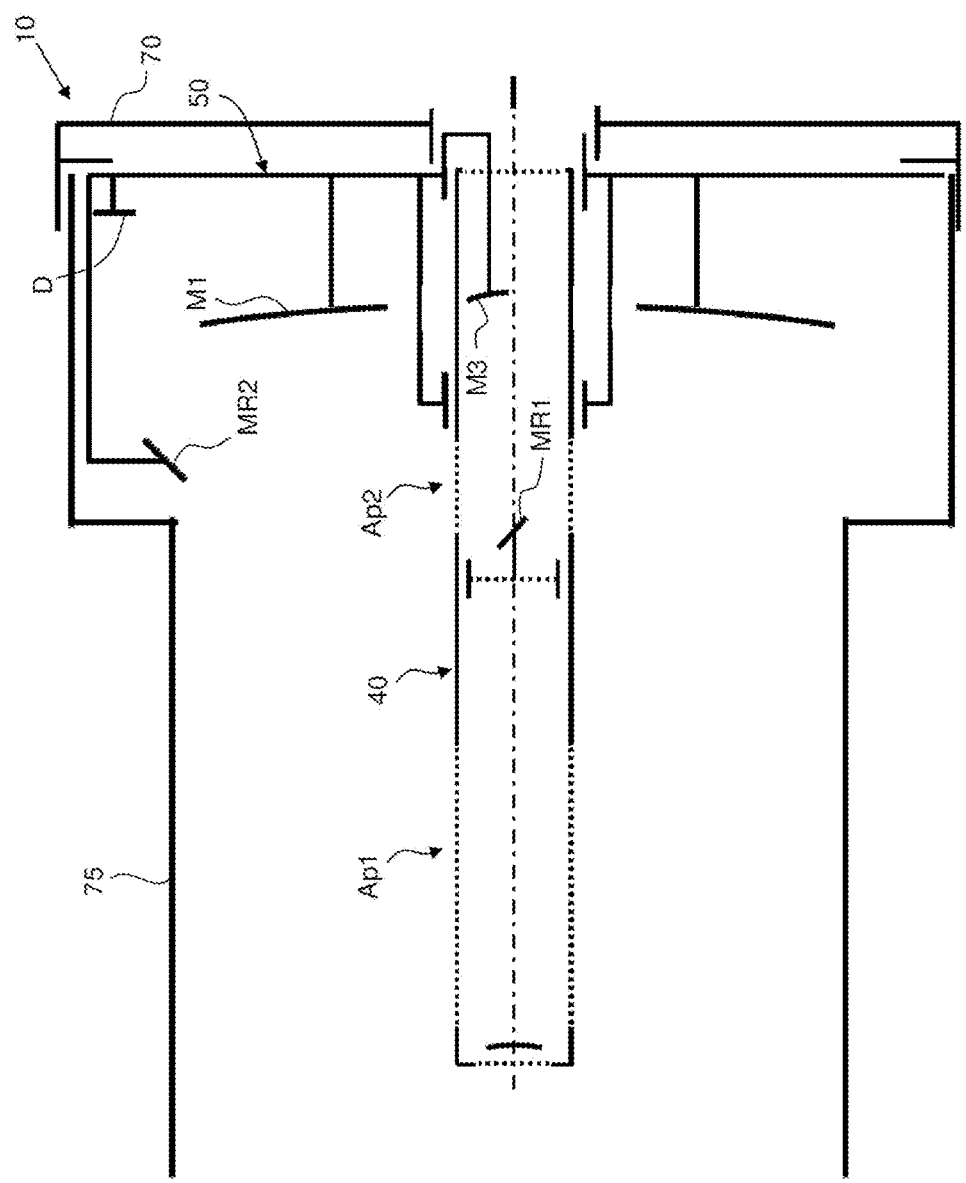
FIGS. 12 and 12a illustrate another variant wherein the other mirror attached to the inside of the hollow structure is MR1 but here MR1 is not the mirror following M2 in the optical combination. It is the mirror M3 which follows M2, M3 being substantially arranged in the plane $P_{AC}$ of the central aperture Ac of the M1, but attached to the bearing structure and not to the hollow structure.
Figure 12A:
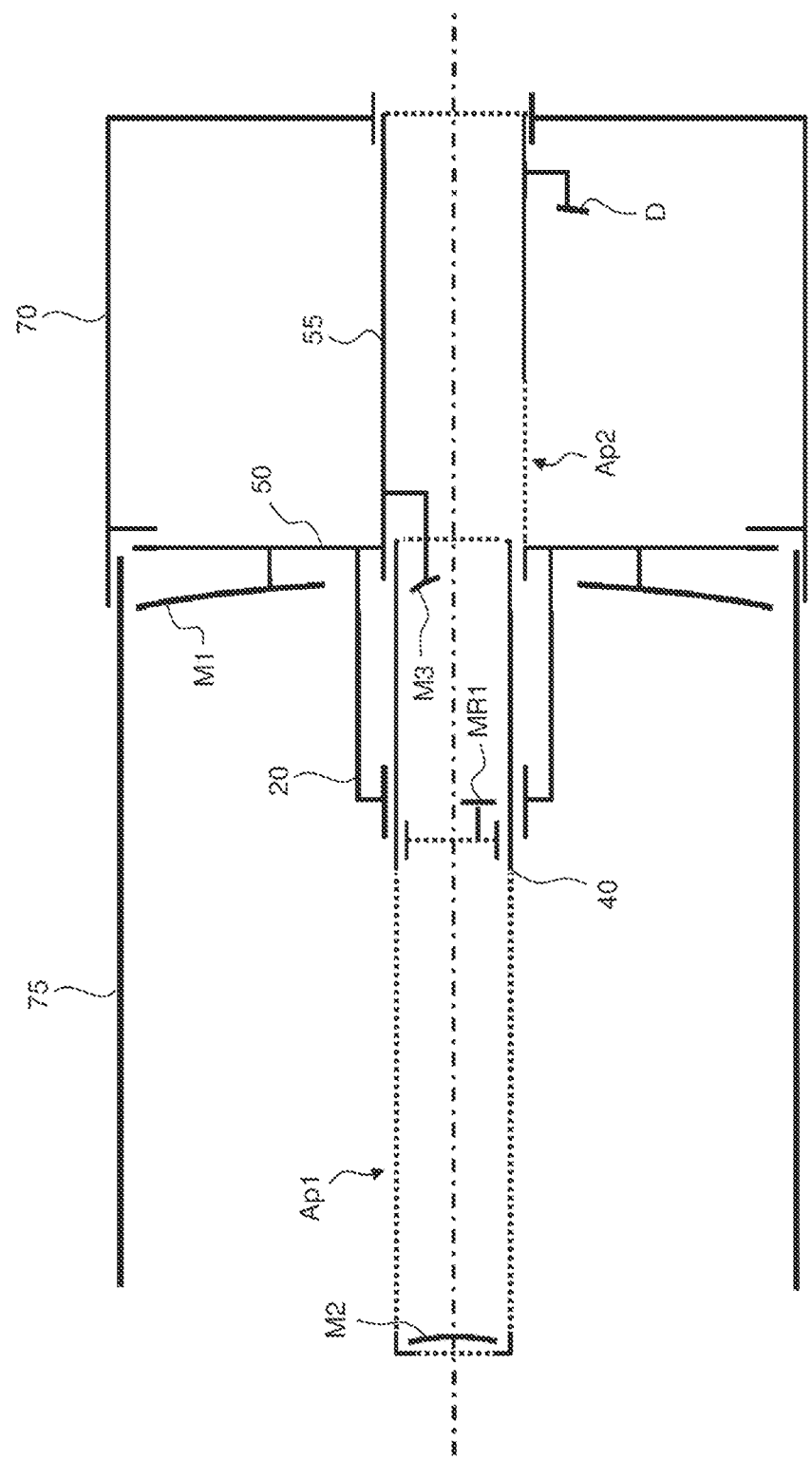

According to another variant illustrated in FIGS. 12 and 12a the other mirror attached to the inside of the hollow structure 40 is the first deflecting mirror MR1 but here MR1 is not the mirror following M2 in the optical combination. It is the mirror M3 that follows M2, M3 being substantially arranged in the plane $P_{Ac}$ of the central aperture Ac of the M1, but here attached to the bearing structure 50 and not to the hollow structure 40. Preferably the hollow structure does not have a rear portion, which is no longer necessary. The attachment of the M3 to the same part as the M1 helps reduce the number of items of uncertainties between the positioning of the 2 parts.

In a sub-variant of FIG. 12, the second deflecting mirror MR2 and the detector D are also attached to the bearing structure 50 on the same face as that which supports the M1. The telescope here is also ultra-compact, without a rear cavity.

In the sub-variant of FIG. 12a, the bearing structure has a rear hollow portion 55 to which the detector D is attached, outside. The detector may be attached directly to the rear portion 55 or via a support structure of the same type as the structure 60.

The interest here lies in placing the maximum elements of the telescope on the bearing structure, so as to reduce the optical dimension chain. Another advantage of the existence of the rear portion is that it makes it possible to partition the rear cavity, creating a thermal insulation of the mirrors present in the rear cavity.

According to one embodiment, a deflecting mirror of the telescope (MR1, MR2 or MR3) is substantially arranged in an exit pupil of the telescope, and is active. This deflecting mirror is then no longer plane as deflecting mirrors generally are, but is provided with a functionality allowing its curvature and its conicity to be modified in order to correct some aberrations/drifts of the telescope.

According to another embodiment a deflecting mirror of the telescope is substantially arranged in an exit pupil of the telescope, is aspherical and adapted to a first focal length of the telescope, and is retractable (not shown) so as to be replaced by at least one other deflecting mirror adapted to another focal length, different from the first focal length as described in document FR 1700254 According to one embodiment the telescope according to the invention further comprises a thermal refocusing device configured for moving the second mirror M2 with respect to the first mirror M1.

According to another aspect the invention relates to a method 100 of manufacturing an anastigmat Korsch telescope with three aspherical mirrors M1, M2 and M3, also comprising at least one first deflecting mirror MR1 and a detector D. M1 has a central aperture Ac.

Figure 13:
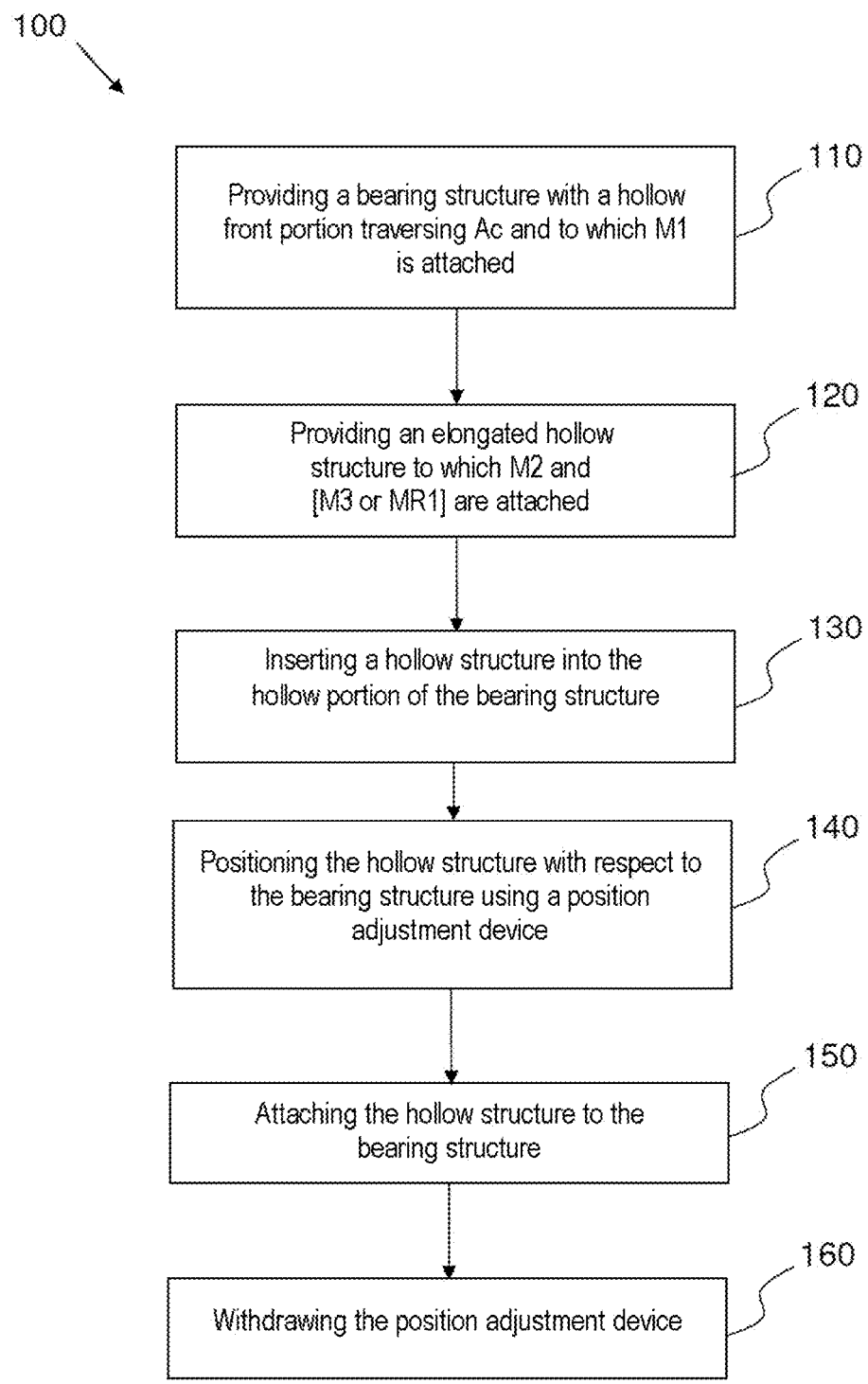
FIG. 13 illustrates a method according to another aspect of the invention.

The method illustrated in FIG. 13 comprises a first step 110 consisting in providing a bearing structure 50 having a first face to which the first mirror M1 is attached and having a hollow front portion 20 traversing the central aperture of the first mirror. This assembly corresponds to the block 50 and to the M1 illustrated in FIG. 5.

A second step 120 consists in providing a hollow structure of elongated shape and limited by walls, attached to the inside of which are the second mirror M2 and at least one other mirror selected from the M3 and the at least one deflecting mirror MR1. The walls of the hollow structure have at least one first aperture Ap1. This element corresponds to the element 40 of FIG. 5.

In a third step 130 the hollow structure 40 is inserted into the hollow front portion 20 of the bearing structure 50 then in a fourth step 140 the hollow structure 40 is positioned with respect to the bearing structure 50 in a direction substantially perpendicular to the plane of the central aperture with a position adjustment device, so that the second mirror M2 is positioned in front of the first mirror M1 at a determined position with respect to the first mirror M1, the first aperture being configured so as to allow a light beam to pass through coming from the object, originating from the first mirror and heading toward the second mirror.

The necessary precision regarding the direction substantially perpendicular to the plane of the central aperture varies according to the optical combination. It may be of the order of a degree, of the order of a milliradian, etc.

The advantage of having an elongated hollow structure to which the M2 is attached is that the delicate adjustment of the M2 with respect to the M1 is done via the adjustment of the structure 40 with respect to the structure 50. The fine adjustment of the position of the M2 via the hollow structure and not from behind helps prevent causing the luminous flux arriving on the M1 to be blocked when adjusting the optical system on the ground. The adjustment device of the M2, arranged on the rear side and which will be withdrawn after the adjustment is therefore no longer limited in size or in mass, which makes it possible to select standard components, thus reducing the costs related to the integration of the telescope.

Then once the structure 40 is correctly positioned so that M2 is in the correct position with respect to M1, in a fifth step 150 the hollow structure is attached to the bearing structure by means of attachment implemented from the front portion of the bearing structure.

The existence of the front portion 20 of the bearing structure 50 located in front of the M1 therefore makes the means of attachment accessible from the front of the telescope, which greatly simplifies adjustment and integration. Preferably the attachment step consists in injecting an adhesive via injection holes arranged in the front portion of the bearing structure.

Finally in a sixth step 160 the position adjustment device is withdrawn. Thus positioning and attachment are dissociated.

The other elements of the telescope are attached and adjusted via DRMs (mirror adjustment devices).

Figure 14:
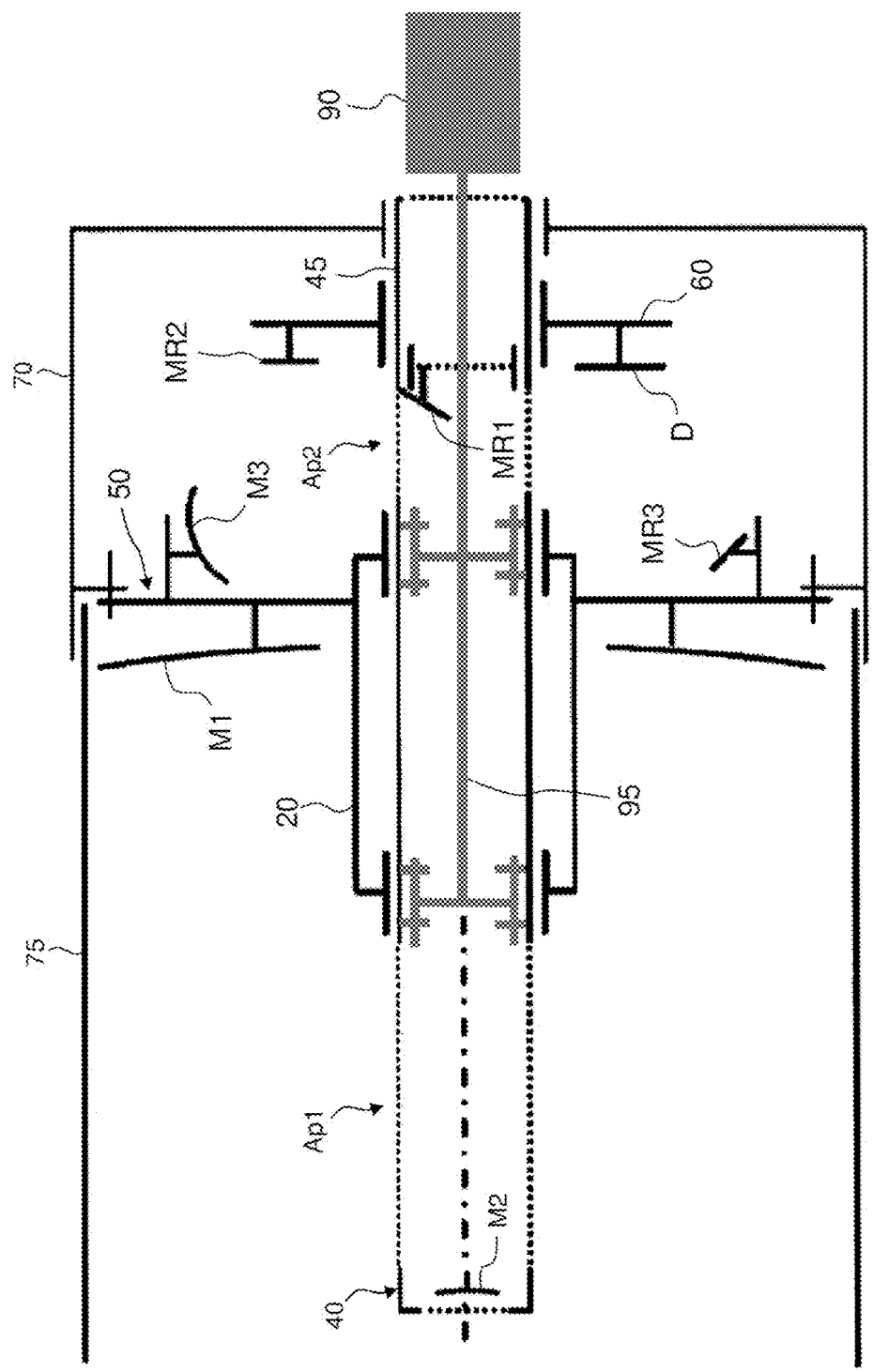
FIG. 14 illustrates a variant of the method wherein the positioning step consists in sliding then temporarily attaching to the inside of the hollow structure an intermediary tool 95 connected to an adjustment device 90 outside the structure.

According to a preferred variant illustrated in FIG. 14 the positioning step consists in sliding then temporarily attaching to the inside of the hollow structure an intermediary tool 95 connected to an adjustment device 90 outside the structure. This device 90, such as a hexapod, allows an adjustment with 6 degrees of freedom in order to precisely position M2 with respect to M1. The position adjustment device therefore consists of the intermediary tool 95 and the outside adjustment mechanism 90.

The adjustment tool may be a shaft, of an openwork design in order to avoid any contact between this shaft and the other mirrors present in the hollow structure at the time of assembly (and disassembly once the adjustment is performed). The intermediary tool is then withdrawn from the inside of the hollow structure. In the prior art the mirror M2 is connected via 3 vanes to a hexapod which remains in position behind the M2 and cuts the flow originating from the object during the adjustment of the optics. Being able to carry out the positioning of the M2 with a hexapod arranged on the rear side which is then withdrawn allows the telescope according to the invention to retrieve more of the flow coming from the object during adjustment.

The invention claimed is:

1. An anastigmat Korsch telescope comprising at least one first concave mirror having a central aperture, a second convex mirror arranged in front of the first concave mirror, a third concave mirror, at least one deflecting mirror and a detector, the first concave mirror, second concave mirror and third concave mirror being aspherical mirrors,
   the mirrors being arranged so that the first concave mirror and the second convex mirror form an intermediate image of an object at infinity, the image being located between the second convex mirror and the third concave mirror, the third concave mirror forming a final image of this intermediate image in the focal plane of the telescope wherein the detector is placed,
   the telescope further comprising:
   a bearing structure having a first face to which the first concave mirror is attached,
   a hollow structure of a shape elongated in a direction substantially perpendicular to the plane of the central aperture, limited by walls, attached to the inside of which are the second convex mirror in a portion of the hollow structure located in front of the first concave mirror, and at least one other mirror selected from the third concave mirror and the at least one deflecting mirror,
   said walls having at least one first aperture so as to allow a light beam to pass through coming from the object originating from the first concave mirror and heading toward the second convex mirror, said bearing structure further comprising an attachment device which attaches the hollow structure to said bearing structure, at least one structure selected from the hollow structure and the bearing structure having a portion traversing said central aperture.

2. The telescope as claimed in claim 1, wherein the bearing structure has a hollow front portion traversing the central aperture and surrounding a portion of the hollow structure, said attachment device being arranged at the level of said front portion of the bearing structure.

3. The telescope as claimed in claim 2, wherein the elongated hollow structure also traverses the central aperture, thus having one portion located at the rear of the first concave mirror.

4. The telescope as claimed in claim 3, further comprising a support structure attached to the portion of the hollow structure located at the rear of the first concave mirror.

5. The telescope as claimed in claim 3, wherein the at least one other mirror attached to the inside of the hollow structure is the at least one deflecting mirror, arranged in the portion of the hollow structure located at the rear of the first concave mirror.

6. The telescope as claimed in claim 1, wherein the bearing structure is in one piece.

7. The telescope as claimed in claim 1, further comprising a rear frame and wherein the bearing structure is attached to said rear frame.

8. The telescope as claimed in claim 1, wherein the walls of the hollow structure comprise at least one second aperture so as to allow a light beam to pass through coming from a mirror attached to the inside of the hollow structure and heading toward a next mirror of an optical combination arranged outside the hollow structure.

9. The telescope as claimed in claim 1, wherein the attachment device consist of adhesive injected via injection holes made in a front portion of the bearing structure.

10. The telescope as claimed in claim 1, wherein the at least one other mirror attached to the inside of the hollow structure is the third concave mirror.

11. The telescope as claimed in claim 10, wherein the third concave mirror is substantially arranged in the plane of the central aperture of the first concave mirror.

12. The telescope as claimed in claim 11, wherein a first distance is defined as the distance between the first concave mirror and the second convex mirror and a second distance as the distance between the second convex mirror and the third concave mirror and wherein said second distance is between 90% and 150% of said first distance.

13. The telescope as claimed in one of claim 11, wherein the at least one deflecting mirror is also attached to the inside of the hollow structure in the portion of the hollow structure located in front of the first concave mirror.

14. The telescope as claimed in claim 1, wherein the at least one other mirror attached to the inside of the hollow structure is the at least one deflecting mirror and wherein the third concave mirror is substantially arranged in the plane of the central aperture of the first concave mirror and is attached to the bearing structure.

15. The telescope as claimed in claim 14, wherein the bearing structure has a rear hollow portion to the outside of which the detector is attached.

16. The telescope as claimed in claim 1, wherein a deflecting mirror of the at least one deflecting mirror is substantially arranged in an exit pupil of the telescope and is active, that is to say that its curvature and its conicity can be modified in order to correct some aberrations/drifts of the telescope.

17. The telescope as claimed in claim 1, wherein a deflecting mirror of the at least one deflecting mirror is substantially arranged in an exit pupil of the telescope, is aspherical and adapted to a first focal length of the telescope, and is retractable so as to be replaced by at least one other deflecting mirror adapted respectively to another focal length, different from the first focal length.

18. A method of manufacturing an anastigmat Korsch telescope with three aspherical mirrors comprising at least one first concave mirror having a central aperture, a second convex mirror, a third concave mirror, at least one deflecting mirror and a detector, the first concave mirror, second convex mirror and third concave mirror being aspherical mirrors, the mirrors being arranged so that the first concave mirror and the second convex mirror form an intermediate image of an object at infinity, the image being located between the second convex mirror and the third concave mirror, the third concave mirror forming a final image of this intermediate image in the focal plane of the telescope wherein the detector is placed, the method comprising the steps of:

providing a bearing structure having a first face to which the first concave mirror is attached and having a hollow front portion traversing the central aperture of the first concave mirror, providing a hollow structure of elongated shape and limited by walls, attached to the inside of which are the second convex mirror and at least one other mirror selected from the third concave mirror and the at least one deflecting mirror, said walls of the hollow structure having at least one first aperture, inserting the hollow structure into the front hollow portion of the bearing structure, positioning said hollow structure with respect to the bearing structure in a direction substantially perpendicular to the plane of the central aperture with a position adjustment device, so that the second convex mirror is positioned in front of the first concave mirror at a determined position with respect to the first concave mirror, the first aperture being configured so as to allow a light beam to pass through coming from the object, originating from the first concave mirror and heading toward the second convex mirror, attaching the hollow structure to the bearing structure by an attachment device implemented from the front portion of the bearing structure, withdrawing the position adjustment device.

19. The method as claimed in claim 18, wherein the positioning step consists in sliding then temporarily attaching to the inside of the hollow structure an intermediary tool connected to an adjustment device outside the hollow structure allowing an adjustment with 6 degrees of freedom, then adjusting said position.

20. The method as claimed in claim 18, wherein the attachment step consists in injecting an adhesive via injection holes arranged in the front portion of the bearing structure.

* * * * *